United States Patent [19]

Bigo

[11] Patent Number: 5,301,931

[45] Date of Patent: Apr. 12, 1994

[54] SUSPENSION DEVICE FOR A PERAMBULATOR, COMPRISING A COMPOSITE STRIP OF VARIABLE STIFFNESS

[75] Inventor: Jean Bigo, Cholet, France

[73] Assignee: Ampafrance S.A., Boulogne-Billancourt, France

[21] Appl. No.: 913,453

[22] Filed: Jul. 15, 1992

[30] Foreign Application Priority Data

Jul. 15, 1991 [FR] France ............... 91 08894

[51] Int. Cl.⁵ .................. B60G 11/107; B62B 7/00
[52] U.S. Cl. ......................... 267/5; 267/41; 280/47.38
[58] Field of Search ............. 267/5, 36.1, 41, 158, 267/229; 280/47.38, 119, 121, 122, 134, 137, 669, 680, 686, 694, 718, 720; 16/44, 35 R

[56] References Cited

U.S. PATENT DOCUMENTS

| | | | |
|---|---|---|---|
| 1,299,165 | 4/1919 | Fulkerson | 280/669 |
| 1,726,189 | 9/1927 | Moir | 267/41 |

FOREIGN PATENT DOCUMENTS

| | | |
|---|---|---|
| 1580175 | 3/1971 | Fed. Rep. of Germany . |
| 386908 | 6/1908 | France . |
| 713257 | 10/1931 | France . |
| 286891 | 3/1928 | United Kingdom . |

*Primary Examiner*—Andres Kashnikow
*Assistant Examiner*—Chris Schwartz
*Attorney, Agent, or Firm*—Oblon, Spivak, McClelland, Maier & Neustadt

[57] ABSTRACT

A device for slow speed and lightweight vehicles, which includes a body fixed on an underframe of the vehicle, a support articulated on the body, and a spring elastically linking the body and the support, wherein the spring is a composite strip fixed at one of ends thereof, to the body, and directly bearing, at a free end thereof, on the wheel axle.

15 Claims, 4 Drawing Sheets

SUSPENSION DEVICE FOR A PERAMBULATOR, COMPRISING A COMPOSITE STRIP OF VARIABLE STIFFNESS

The present invention relates to a suspension device for slow speed and lightweight vehicles, such as, for example, a perambulator.

Perambulators are generally constituted by a frame and four wheels or four sets of two twin wheels. Each wheel or each set of wheels is linked by the intermediary of a suspension device to an underframe generally constituted by a tube.

Known suspension devices; comprise at least one so-called "coil" spring working in compression or in extension, and the springs are generally flexible in order to give an impression of comfort, when the customer tests the perambulator in the shop. But when the baby is placed in the perambulator, the coil springs remain flexible and the perambulator is thus not very comfortable for the baby.

SUMMARY OF THE INVENTION

The object of the present invention is to provide greater comfort for such perambulators by means of a suspension device by virtue of which the suspension is flexible under no load and firmer under load.

The subject of the present invention is a suspension device for slow speed and lightweight vehicles, comprising a body with a rounded surface fixed on an underframe of the vehicle and a spring in the shape of a strip fixed at one of its ends to the body and bearing both on the rounded surface of the said body and on a wheel axle at its other free end, with a view to bending. According to the invention, the wheel axle is securely fixed to a support articulated on the body by the intermediary of a pin placed between the fixing point of the strip spring on the body and the bearing point of the free end of this strip spring on the wheel axle.

The rounded surface of the body preferably has a radius of curvature which is greater than the radius of curvature of the strip spring in natural bending in the absence of the rounded surface.

The free end of the strip-shaped spring can advantageously slide on the wheel axle when the spring is stressed in bending so that the active part of the strip, in the position of maximum bending, is shorter than the active part of the strip, under no load.

The spring can advantageously comprise a pultruded composite strip.

In a preferred embodiment of the invention the body of the suspension device comprises two lateral wings bearing the articulation pin of the support and between which wings the strip spring is installed. The support can also comprise two small lateral wings placed outside the wings of the body.

In a particularly advantageous embodiment of the invention a counter-strip is arranged under the strip-shaped spring and fixed at one of its ends to the body, its other free end being able to bear, after a first specified rotation of the articulated support, on a stop which is securely fixed to the support. This stop can for example be constituted by a yoke linking the small lateral wings of the articulated support together.

The counter-strip can advantageously have on its lower surface a traversing passage of an oblong profile adapted to receive the articulation pin of the articulated support in order to act as a stop, after a second specified rotation of the articulated support, which is greater than the first rotation.

The traversing passage is advantageously placed substantially in the median zone of the counter-strip. The latter preferably has a thickness decreasing from its fixed end towards its free end.

The counter-strip is advantageously made of a synthetic material and can be a result of molding with a rigid bearing element of rounded profile which is mounted in the body defining the rounded surface of the latter. The strip-shaped spring can thus easily be housed in a slot defined between the bearing element and the counter-strip.

The rotational movement of the articulated support can be limited by the stop contact provided on the lateral wings of the body which interact with the edges of the small lateral wings of the articulated support.

There are described hereafter, by way of non-limiting examples and with reference to the figures of the appended drawings two variants of the suspension device according to the invention.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE EMBODIMENTS

Figure 1:
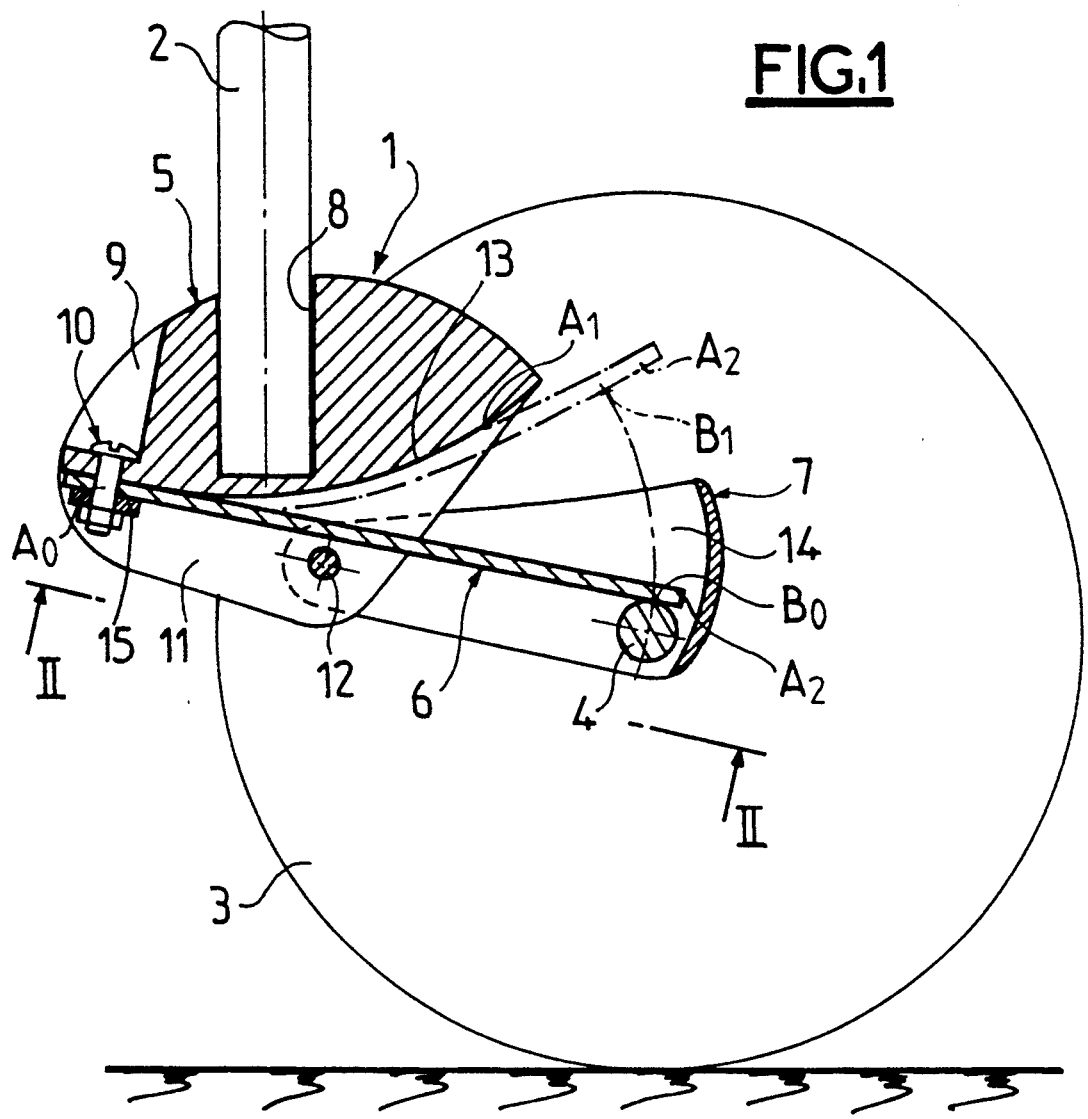
FIG. 1 shows a complete view of a first variant of the device, in a section taken along line I—I of FIG. 2.

Such as it is illustrated in FIG. 1, the device 1 according to the invention is represented mounted on an underframe 2 of a pushchair, constituted by a tube, the device 1 bearing a wheel 3 by the intermediary of its axle 4.

Figure 2:
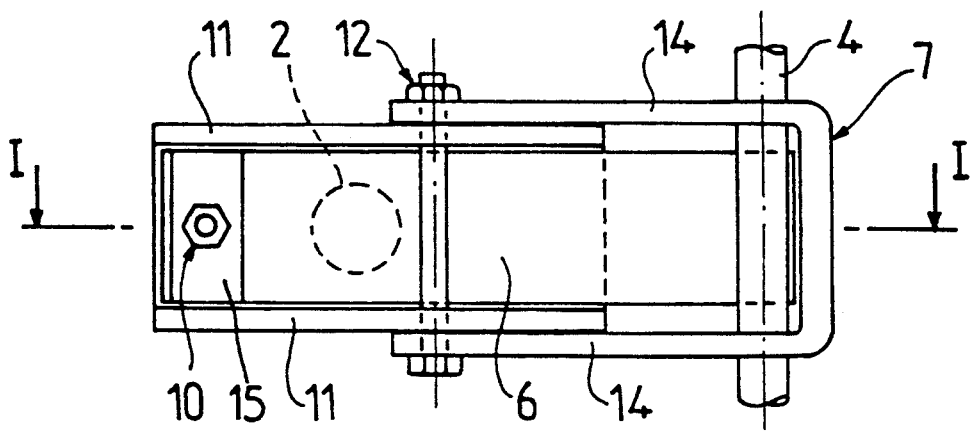
FIG. 2 shows a view from below taken along line II—II of FIG. 1.

The device 1 mainly comprises a body 5, a strip-shaped spring 6 and a support 7 articulated on the body 5. The body 5 comprises an orifice 8, in which the tube 2 is housed, an external countersink 9 making it possible to install a bolt 10, which rigidly fixes the body 5 and one end of the strip 6. A flat member 15, serving as a washer, is placed between the strip spring 6 and the nut of the bolt 10. The body 5 comprises, in addition, two lateral wings 11, bearing a pin 12, constituted for example by a bolt, the strip spring 6 being installed between the two wings 11 of the body 5, as is shown in FIG. 2. The body 5 has in the area of the connection of the two wings 11, and over its whole width, from one end to the other of the wings 11, a rounded part 13 on which the strip spring 6 progressively bears, during bending, as shown by the strip represented in broken lines in FIG. 1.

The strip spring 6 is for example a protruded strip.

The support 7 also comprises two small lateral wings 14 each equipped, at one end, with an orifice permitting the installation of the pin 12. The small wings 14 of this support are on the outside of the wings 11 of the body 5, as is shown in FIG. 2. The support 7 is thus rotatably articulated on the body 5 by the intermediary of the pin 12. The support 7 bears the wheel 3 axle 4 which can be placed overhanging the device 1 on one side or the other thereof. The axle 4 can also bear two twin wheels placed on either side of the device 1.

Such device operates in the following manner:

When under no load, as shown in solid lines in FIG. 1, the strip spring 6 is almost rectilinear and it bears upon the wheel 3 axle 4 at its so-called "free" end and is not secured to the axle 4.

Under normal load, which substantially corresponds to the weight of the baby, the strip spring bends and the suspension thus becomes firmer.

Finally, under maximum load, which generally corresponds to the weight of the baby and to stress due to unevenness of the ground, the strip spring bends until it reaches maximum bending represented in broken lines in FIG. 1. The strip spring is thus bearing over practically the entire length of the rounded part 13, in fact, up to the point referenced $A_1$.

The rounded part 13 makes it possible to increase the fatigue resistance of the strip spring 6 due to the fact that the radius of curvature of this rounded part is greater than the radius of curvature which would be described by the strip spring 6 in natural bending, in the absence of the rounded part.

Furthermore, during the rotation of the support 7 the strip spring 6 bends but it also slides on the axle 4 because the articulation point of the support 7 (that is to say the pin 12) is not the same as the articulation point of the strip spring (that is to say the point $A_0$), so that, in the position of maximum bending, the inactive part of the strip spring represented by the segment between points $A_2$-$B_1$, is greater than the inactive part of the strip, when under no load, represented by the segment between points $A_2$-$B_0$.

The rounded part 13, which makes it possible to increase the fatigue resistance of the strip, as has been described previously, also makes it possible to decrease the active part of the strip spring 6 during its bending, and thus contributes to obtaining a variable stiffness, which increases proportionately as the strip spring bends. Thus, FIG. 1 shows, in broken lines, that the active part of the strip spring 6 in the position of maximum bending which is represented by the segment between points $A_1$-$B_1$, is much shorter than the segment between points $A_0$-$B_0$ representing the active part under no load. The suspension thus becomes proportionately firmer as the strip bends.

The position of the rotation pin 12 of the support 7 and the rounded part 13 thus provide, separately or in combination, modification of the stiffness of the strip spring 6 thus giving a sensation of flexibility under no load and yet being comfortable when under load.

Figure 3:
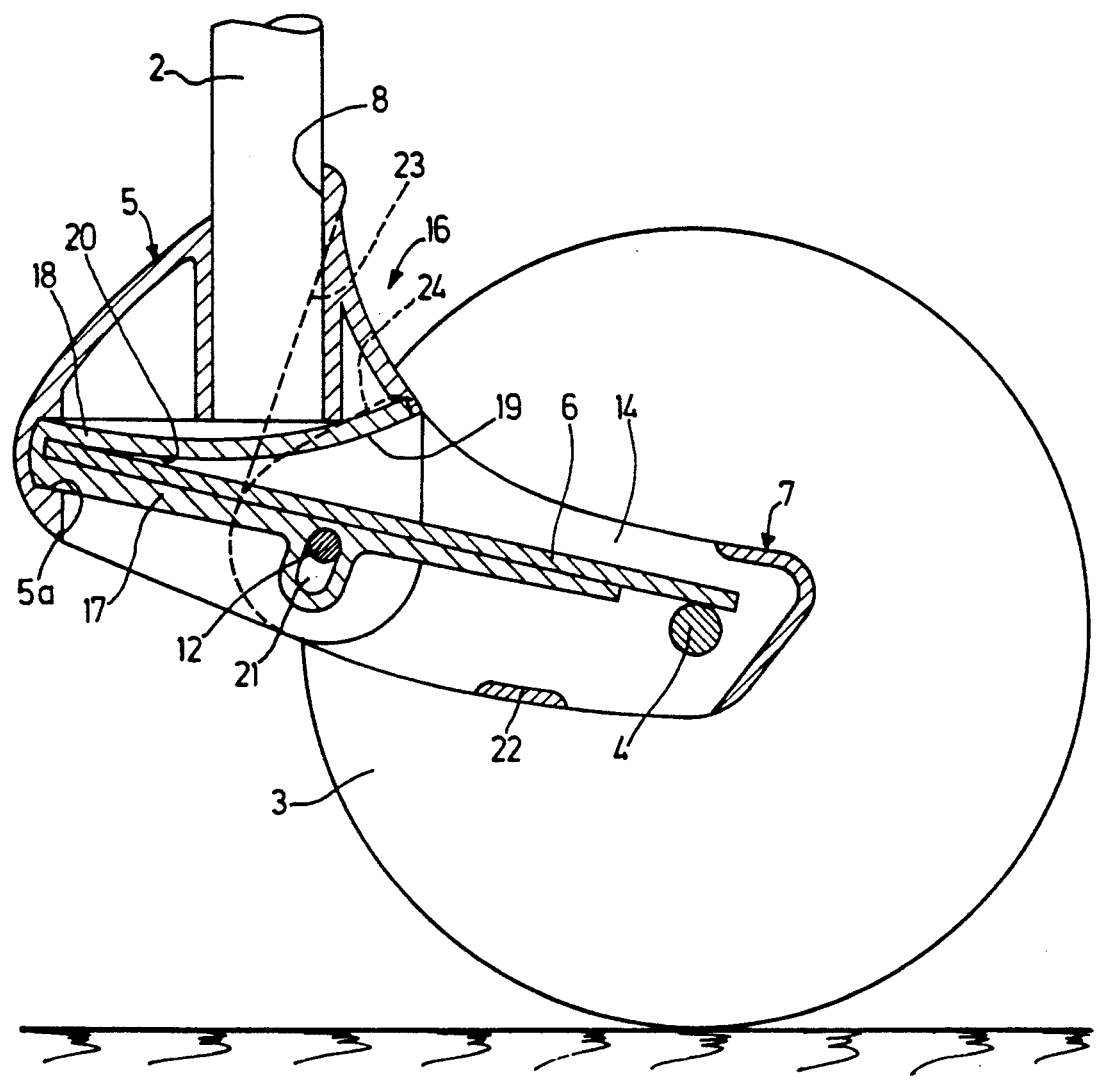
FIG. 3 shows a view in section similar to FIG. 1 of a second embodiment of the invention, in the unloaded position.
Figure 4:
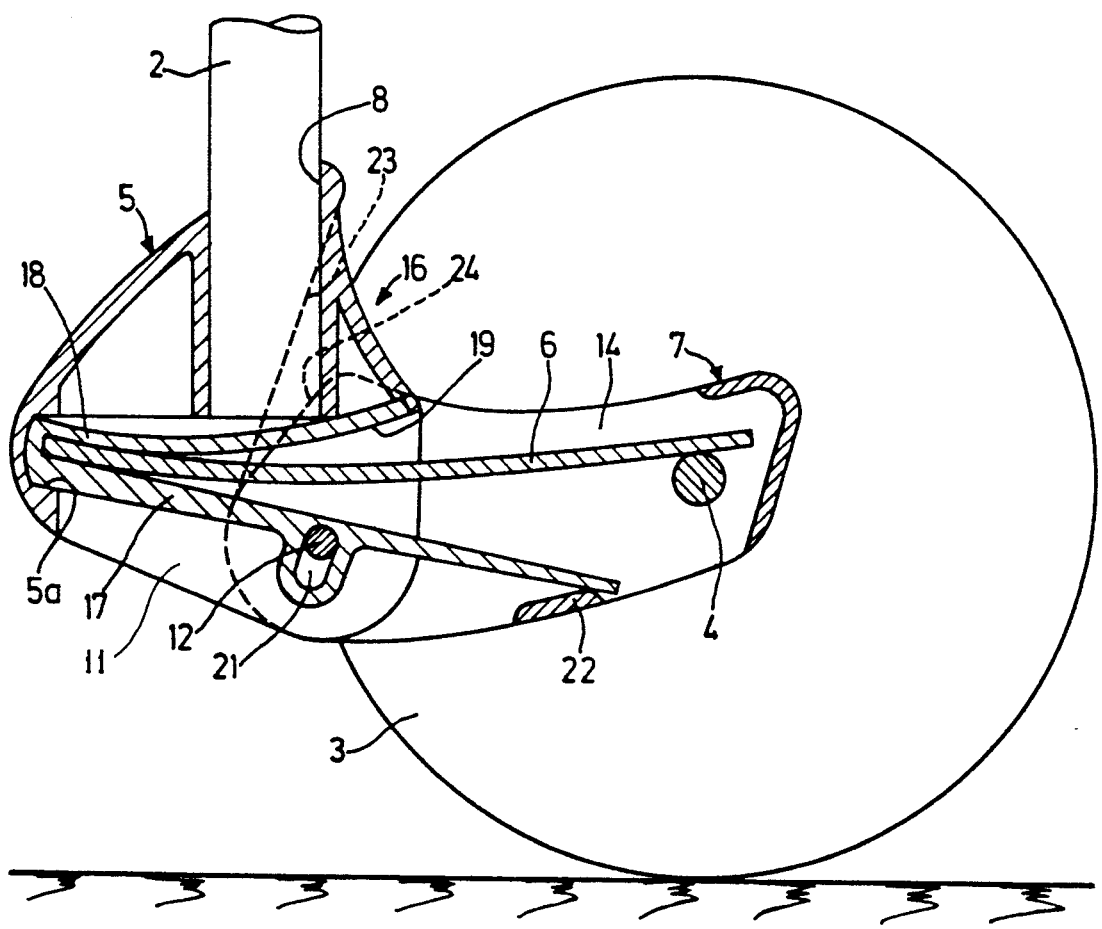
FIG. 4 is a view similar to FIG. 3 but showing the device in the normally loaded position.
Figure 5:
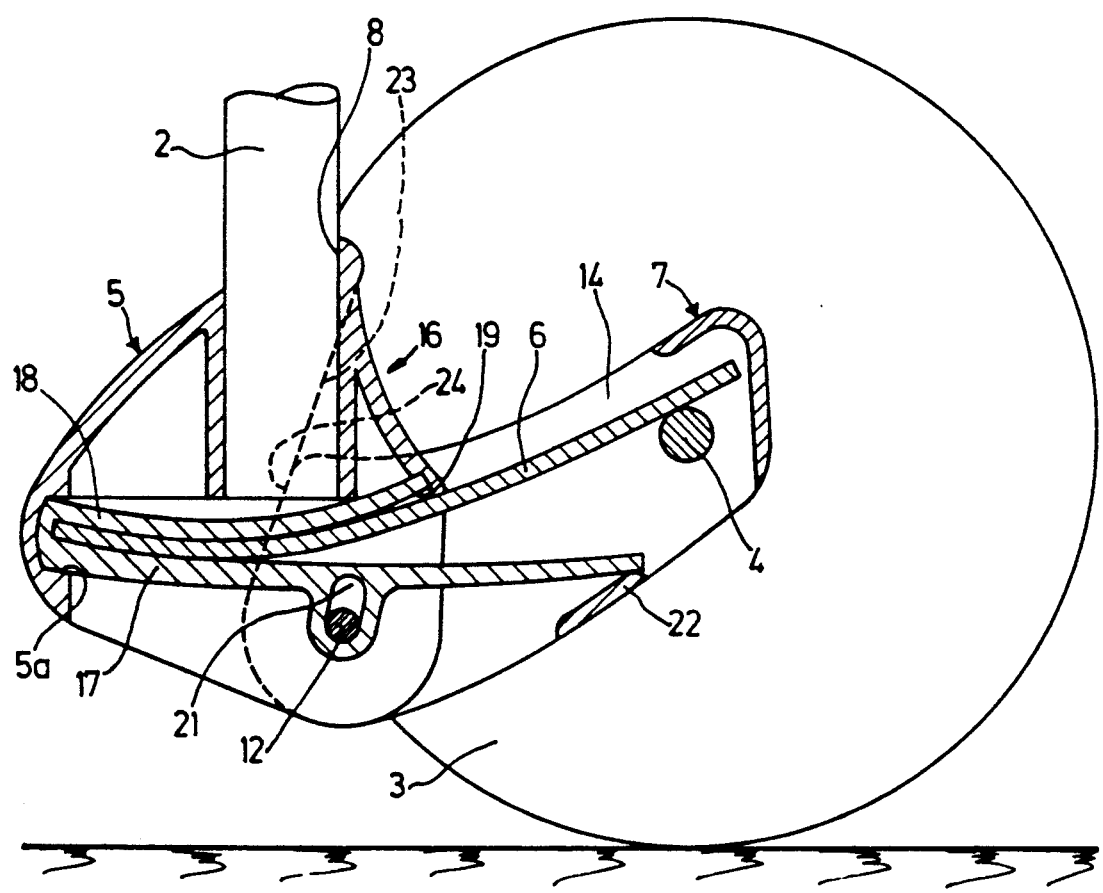
FIG. 5 is a view similar to FIG. 3 but showing the device in the maximum load position.

FIGS. 3 to 5 illustrate a second embodiment of the device of the invention. In these figures identical or similar pieces bear the same references.

The device referenced 16 overall is mounted as previously on an underframe 2 of a pushchair constituted by a tube. Again, the wheel 3 is equipped with its axle 4, on which axle the free, unsecured end of the strip spring 6 bears. The device also comprises a body 5 with respect to which a support 7, which can pivot about an articulation pin 12, is articulated.

In this variant, a counter-strip 17 is arranged under the major part of the strip spring 6. The counter-strip 17 is made in the example illustrated in the shape of a part moulded from synthetic material resulting from moulding with a rigid bearing element 18 which comes to bear on one of the faces on the body 5 and has on its opposite face a rounded profile 19 which acts as the rounded part 13 of the variant illustrated in FIG. 1.

Opposite its free end, the counter-strip 17 is securely fixed to the bearing element 18, a slot 20 being defined between the bearing element 18 and the counter-strip 17. This slot 20 has a thickness substantially equal to that of the strip spring 6 which can thus be housed in the slot 20 by its fixed end that is to say its end opposite the free end which bears on the wheel 3 axle 4, which in a simple manner fixes the strip spring 6.

The whole of the molded piece which comprises the bearing element 18 and the counter-strip 17 is housed in a recess 5a made in the body 5.

The counter-strip 17 has on its lower surface a traversing passage 21 of an oblong profile directed substantially from the top downwards and adapted in order to receive the articulation pin 12 of the articulated support 17. The pin 12 can thus move inside the passage 21 between two stop positions. The top stop position illustrated in FIG. 3 corresponds, as will be seen later, to the no load position of the suspension device 16.

The counter-strip 17 has a thickness decreasing from the fixed end which is securely fixed to the rigid bearing element 18 towards its free end which finishes under the strip spring 6 in the proximity of the axle 4. The length of the counter-strip 17 is sufficient for its free end to come into contact with a yoke 22 linking the small lateral wings 14 of the articulated support 7 together and placed in a lower position than the latter. A stop 23 formed by an edge of the material constituting each of the lateral wings of the body 5 makes it possible, through contact with the edge 24 of the corresponding small lateral wing 14 of the articulated support 7 to limit the rotational movement of the latter.

The relative movement of the various elements of the suspension device 7 during its operation will now be described:

FIG. 3 illustrates the position of the device under no load. In this position, the strip spring 6 is almost flat and at its free end bears on the wheel 3 axle 4. The counter-strip 17, also flat, is in contact over its entire upper face with the lower face of the spring strip 6. The articulation pin 12 is in the top stop position inside the oblong passage 21.

In FIG. 4 which illustrates the normal load corresponding substantially to the weight of the baby, the strip spring 6 is bent, the suspension having become firmer. As in the first variant illustrated in FIG. 1, the stiffness of the suspension increases progressively by virtue of the fact that the fixed end of the strip spring 6 comes progressively into contact with the rounded part 19, which progressively decreases its active part. The same effect is obtained by the free end of the strip spring 6 sliding on the axle 4 as in the preceding variant. Also in the same manner the radius of curvature of the rounded part 19 is preferably greater than the radius of curvature which would be described by the strip spring 6 in natural bending in the absence of the rounded part.

The maximum normal load corresponds substantially to the position illustrated in FIG. 4, in which the free end of the counter-strip 17, comes into contact with the yoke 22 which acts as the stop. Up to this point, the counter-strip 17 has remained flat and has played no active part in the suspension device. The articulation pin 12 is still in the top stop position in the oblong passage 21.

When the load increases further as far as the position corresponding to the maximum load illustrated in FIG. 5, the strip spring 6 continues its bending in the same positions as previously indicated, still remaining in contact with the rounded part 19, its active length continuing to decrease.

Simultaneously, the counter-strip 17 bends. In this movement, the active bending part of the counter-strip 17 also varies proportionately with the bending given that the portion of the counter-strip 17 which is close to its fixed end, comes into contact with the corresponding portion of the strip spring 6 which has a rounded profile corresponding to that of the rounded part 19. This bending continues until the counter-strip 17 has lifted up with respect to the articulation pin 12, the latter coming into the bottom stop position in the oblong passage 21 as illustrated in FIG. 5. The device thus assumes the position corresponding to the maximum load as illustrated in FIG. 5 in which the pivoting movement of the articulated support 7 with respect to the body 5 is stopped by the interaction of the stops 23 and 24.

The presence of the counter-strip 17 makes it possible further to improve the results already obtained with the first variant and in particular to increase the hardness of the suspension for loads which exceed the normal load.

I claim:

1. A perambulator having a frame and at least four wheels, each mounted on a wheel axle, at least two of said wheel axles being connected to said frame by suspension devices, each suspension device comprising:
    a body secured to said frame and having a rounded contacting surface, said body including a pin;
    a strip spring having a first end secured to said body at a securing point and a second, free and unsecured end opposite to said first end which bears freely against said wheel axle; and
    a movable support assembly mounted for rotation on said pin of said body and which is mounted on said wheel axle, said pin being located between said securing point of said strip spring and said wheel axle wherein in use of the perambulator a downward force exerted on said body bends said strip spring so as to bear on said rounded contacting surface.

2. Perambulator according to, claim 1 wherein the body comprises two lateral inner wings for supporting the pin and between which the strip spring is positioned.

3. Perambulator according to claim 2, wherein the support comprises two outer lateral wings placed outside the inner wings of the body.

4. Perambulator according to claim 3, wherein stops are provided on the lateral wings of the body for limiting the rotational movement of the articulated support by contact with the edges of the lateral wing of said support.

5. Perambulator according to claim 1, wherein the rounded surface of the body has a predetermined radius of curvature.

6. Perambulator according to claim 5, wherein the free end of the strip-shaped spring is slidable on the wheel axle when said spring is stressed in bending so that an active part of the strip, in a position of the maximum bending is shorter than an active part of the strip under no load.

7. Perambulator according to claim 1, wherein the spring comprises an extruded composite strip.

8. A perambulator having a frame and at least four wheels, each wheel being mounted on a wheel axle and at least two of said wheel axles being connected to said frame by suspension devices, each suspension device comprising:
    a body secured to said frame and having a rounded contacting surface, said body including a pin;
    a strip spring having a first end secured to said body at a securing point and a second end opposite to said first end for bearing freely on said wheel axle in an unsecured manner;
    a movable support assembly mounted for rotation on said pin of said body and mounted on said wheel axle, said pin being located between said securing point of said strip spring and said wheel axle; and
    a counter strip positioned under said strip spring and having a first end secured to said body near said securing point and a second end for bearing, after a first specified rotation of said movable support assembly, on a stop member which is securely fixed to said support assembly wherein in use of the perambulator a downward force is exerted on said body bends said strip spring so as to bear on said rounded contacting surface.

9. Perambulator according to claim 8, wherein said counter-strip is fixed at one end thereof to the body and an opposite free end thereof bears, after a first specified rotation of the articulated support, on said stop member.

10. Perambulator according to claim 9, wherein the counter-strip has on a lower surface thereof a traversing passage of an oblong profile for receiving the articulation pin of the articulated support so as to act as the stop member, after a second specified rotation of the articulated support, which is greater than the first rotation.

11. Perambulator according to claim 10, wherein the traversing passage is located substantially in a median zone portion of the counter-strip.

12. Perambulator according to claim 9, wherein the counter-strip comprises a synthetic material.

13. Perambulator according to claim 12, wherein the counter-strip comprises a molded strip having a rigid bearing element of a rounded profile which is mounted in the body for defining said rounded surface of the body, and a slot is defined between the bearing element and the counter-strip for housing the first end of the strip spring.

14. Perambulator according to claim 9, wherein the stop member comprises a yoke linking lateral wings of the articulated support together.

15. Perambulator according to claim 9, wherein the counter-strip has a thickness which decreases from the first end towards the second end.

* * * * *